INVENTOR.
EUGENE W. PEARSON
BY
HIS ATTORNEYS

Jan. 11, 1966  E. W. PEARSON  3,229,050
EXTERNAL-PRESSURE VESSEL
Filed Nov. 19, 1962  3 Sheets-Sheet 2

INVENTOR.
EUGENE W. PEARSON
BY
Bruce & Brosler
HIS ATTORNEYS

Jan. 11, 1966  E. W. PEARSON  3,229,050
EXTERNAL-PRESSURE VESSEL
Filed Nov. 19, 1962  3 Sheets-Sheet 3

INVENTOR.
EUGENE W. PEARSON
BY
Bruce & Brosler
HIS ATTORNEYS

United States Patent Office 3,229,050
Patented Jan. 11, 1966

3,229,050
EXTERNAL-PRESSURE VESSEL
Eugene W. Pearson, Orinda, Calif., assignor to Pacific Press & Shear Corp., a corporation of Illinois
Filed Nov. 19, 1962, Ser. No. 238,505
4 Claims. (Cl. 220—5)

My invention relates to vessels or containers and more particularly vessels which in use, will be exposed to heavy external loading, either by reason of externally applied pressures or internally reduced pressures.

According to conventional practice, in constructing vessels to withstand heavy external loadings, such vessels are normally fabricated of metal plate shaped to form cylindrical or spherical walls. Being under compressions, the metal plate must of necessity be of heavy gauge to forestall buckling of the walls under the pressures to which the walls will be exposed. Also all walls must be securely joined as by riveting, bolting or welding, to adjacent walls to maintain a unitary assembly which will be safe against bursting or collapsing when exposed to extremely high pressures.

Among the objects of my invention are:
(1) To provide a novel and improved vessel;
(2) To provide a novel and improved vessel of extremely light weight and capable of withstanding heavy external loads without collapsing;
(3) To provide a novel and improved vessel capable of withstanding heavy external loads, and which may be assembled without necessarily permanently fixed joints;
(4) To provide a novel and improved vessel which is self-sealing when exposed to external loading;
(5) To provide a novel and improved vessel in which internal explosive forces are not likely to produce any permanent damage;
(6) To provide a novel and improved vessel which functions more effectively when under external loading;
(7) To provide a novel and improved vessel capable of being disassembled into its component parts in response to internal explosive forces, and with minimum likelihood of damage to such components.

Additional objects of my invention will be brought out in the following description of a preferred embodiment of the same, taken in conjunction with the accompanying drawings, wherein.

Figure 1:
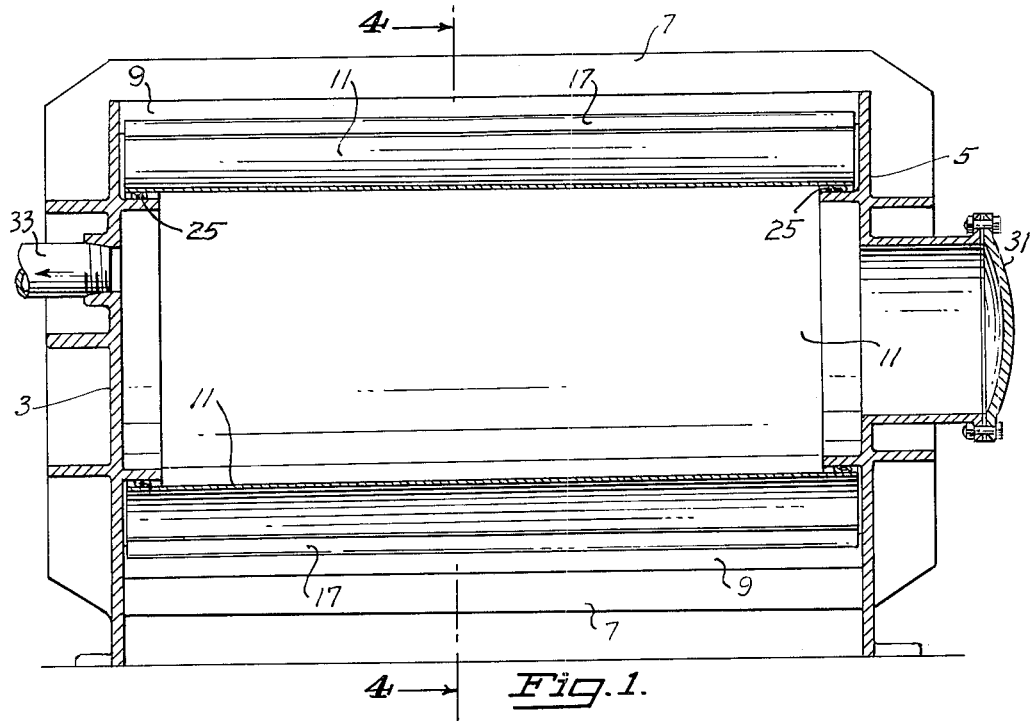
FIGURE 1 is a longitudinal view in section through a vessel embodying the present invention.
Figure 2:
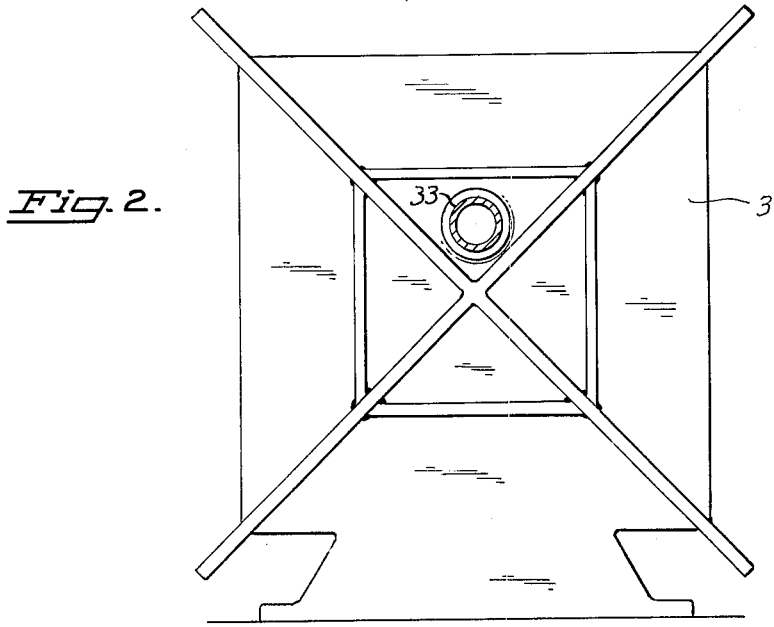
FIGURE 2 is a view in elevation at one end of the vessel of FIGURE 1.
Figure 3:
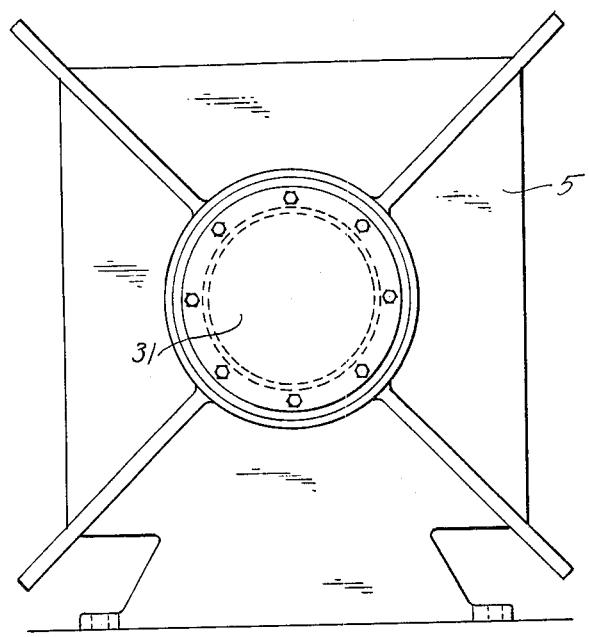
FIGURE 3 is a view in elevation at the opposite end of the vessel of FIGURE 1.
Figure 4:
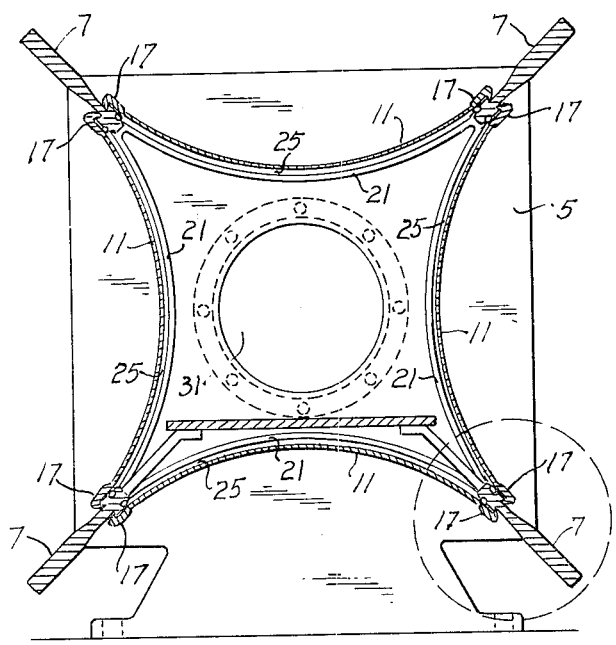
FIGURE 4 is a view in cross section, taken in the plane 4—4 of FIGURE 1.
Figure 5:
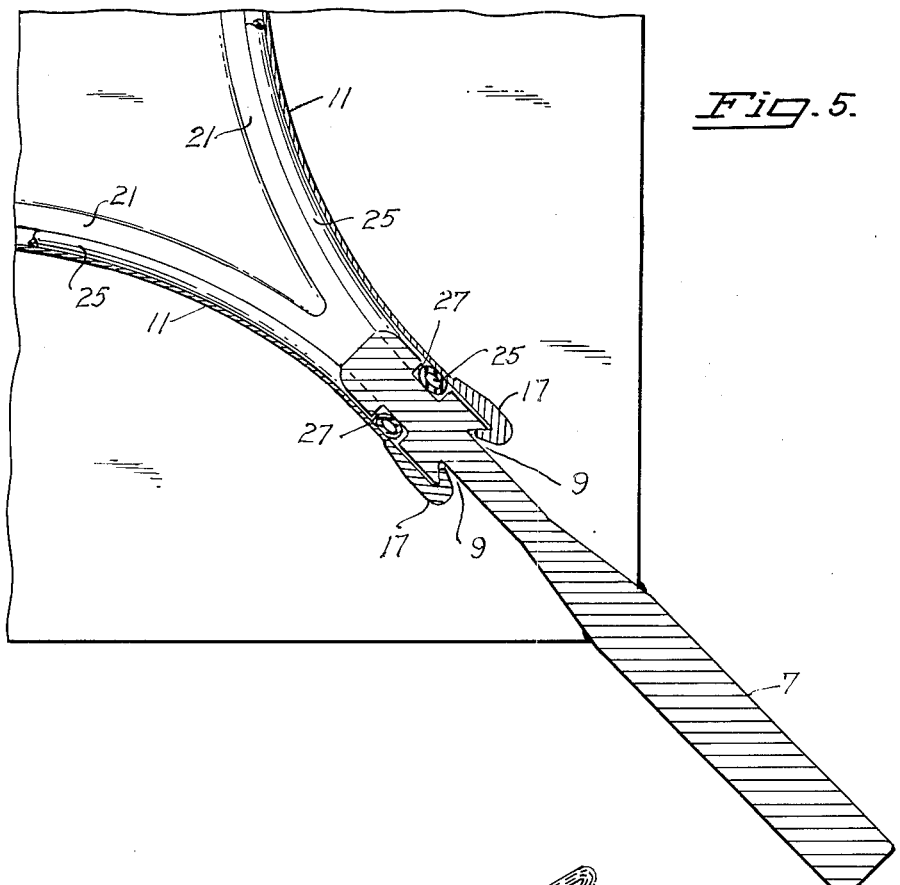
FIGURE 5 is an enlarged or magnified view of the encircled portion of FIGURE 4, depicting details of a corner portion of the vessel.
Figure 6:
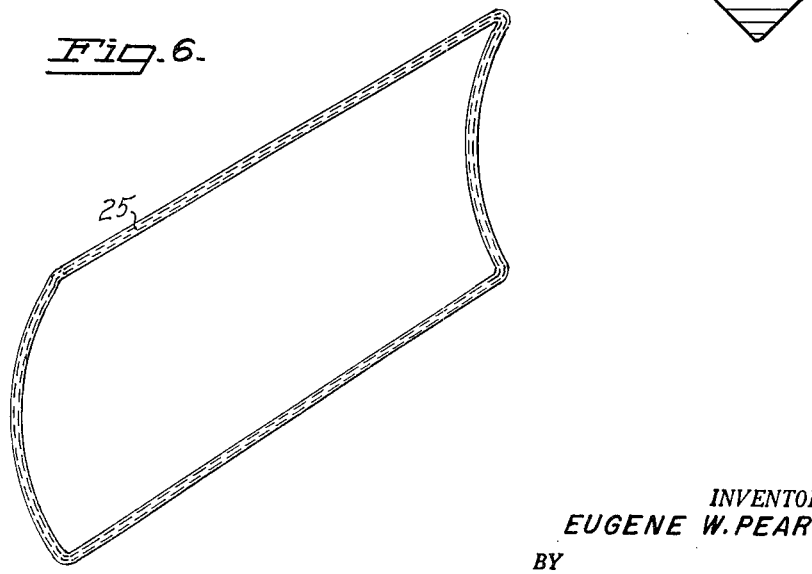
FIGURE 6 is a view depicting a seal employed in the vessel of the preceding figures.

Referring to the drawings for details of my invention in its preferred form, the vessel illustrated involves a frame including a pair of end walls 3, 5, reinforced if need be, and connected by a plurality of longitudinal frame members 7, the frame members being parallel to each other in spaced relationship, with each frame member preferably being provided with an anchoring groove 9 longitudinal thereof along each side.

Each side wall 11 of the vessel is formed of sheet or plate material, which in most applications of the present invention will be of sheet metal suspended between a pair of the frame members 7 by anchoring each of the longitudinal edges of each such side wall in the proximate anchoring groove of the adjacent frame member. Such anchoring of the side walls can be accomplished by affixing to each longitudinal edge, an anchor lip 17 and shaping the anchoring groove 9 so that the down-turned lip may snugly fit into the same and be retained.

The side wall when thus applied, will assume a concave form as viewed from outside the vessel, whereupon any external loading applied to the wall will place the wall under tension. Inasmuch as sheet material can withstand tension stresses to a far greater degree than compressive forces it follows that the walls when formed in accordance with the foregoing, may be of relatively thin material when compared to wall thickness of conventionally constructed vessels designed to the same loading requirements.

In some applications of the invention, the walls may be of flexible sheet material which when arced in the process of installing a wall will assume sufficient rigidity to become self-sustaining. In other applications rigid preformed walls may be utilized.

In order to seal the edges of each of such walls, I provide a supporting rib 21 on the inner side of each of the end walls of the vessel frame, such rib following the curvature of the adjacent end edge of the proximate side wall in supporting relationship thereto, and on such rib, I provide a seal 25 which may take the form of a hollow tube, or a tube which may be inflatable.

Sealing along the longitudinal or suspension edges of each wall may be effected by providing a sealing groove 27 along the frame member just below the anchoring groove and paralleling the same, such sealing groove being so located as to terminate at the proximate ends of the opposing end wall ribs, so that the sealing tubes carried by such ribs may become part and parcel of a single tube extending also along the sealing grooves.

Thus, each wall will not only engage such sealing tube along the ribs of the opposing end walls, but as such side wall tangentially approaches each frame member 7, it will engage and seal against that portion of the sealing tube lying in the sealing grooves, thus assuring sealing at the corners as well as along the edges of the side wall. And with an external loading applied to the side walls of the vessel, the sealing pressure will increase accordingly, and this is a desirable characteristic, in that effective sealing will be assured under conditions when it could be most needed.

Access to the interior of the vessel and exit therefrom, may be provided for, by doors in one or both of the end walls, or one end wall may be provided with a manhole type cover 31 while the other may have a pipe 33 extending therefrom.

A vessel embodying the basic construction of the present invention will have many applications in widely diversified fields. For example, in the testing of missiles under rarified conditions such as exist in the stratosphere, the vessel lends itself to the creation of a rarified atmosphere within simulating stratospheric conditions, in which case the external loading on the side walls of the vessel will be due to the creation of such rarified atmosphere.

On the other hand, a vessel embodying the basic principles of the present invention, lends itself to applications wherein the external loading will be due to the application of external pressures to the side walls of the vessels, a condition which could be encountered in deep sea exploratory work.

Regardless of the field of application to which the present invention may be applied, any physical loads to be supported within the vessel, may be suspended or otherwise carried by the framework, thus leaving the side walls essentially free from any stress or strain which might otherwise be created were such internal loads to be attached to such walls.

The number of side walls involved in the construction of a vessel embodying the present invention, is not limited to the four walls in the preferred embodiment illustrated, but may vary from a minimum of three on up.

From the nature of the construction described, it is not essential to affix the side walls to the frame in any conventional manner, as by bolting, riveting or welding, though in some instances, it may be desirable to fasten the side walls to the frame structure so as to assure that the same will hold together during neutral loading, as when atmospheric pressure exists on both sides of the side walls.

In the event the differential pressure on the side walls, which results in the external loading of the vessel, should become reversed, as in the event of an internal explosion, the side walls will offer little resistance and will be blown out of the assembly, and with little likelihood of damage, either to the side walls or to the frame structure of the vessel, in which case, the vessel may be reassembled with little, if any, difficulty, and in a minimum of time.

From the foregoing description of my invention in its basic form, it will be apparent that the same will fulfill all the objects attributed thereto, and while I have illustrated and described the same in a preferred form, it will be apparent that the same is subject to alteration and modification without departing from the underlying principles involved. I, accordingly, do not desire to be limited in my protection to the specific details illustrated and described except as may be necessitated by the appended claims.

I claim:
1. A vessel adapted to withstand heavy external pressure without collapsing, comprising
a frame including
a pair of end walls,
frame members connecting said end walls,
said frame members being substantially parallel to each other in spaced relationship;
a plurality of inwardly concave side walls, each extending between a pair of said frame members and between said end walls;
means releasably anchoring said side walls to said frame members and to said end walls, to permit release of said side walls therefrom with a little likelihood of damage to said side walls and said frame thereby permitting simple reassembly of said vessel;
and means sealing the edges of each of said concave side walls to said frame.

2. A vessel adapted to withstand heavy external pressure without collapsing, comprising
a frame including
a pair of end walls,
frame members connecting said end walls,
said frame members being substantially parallel to each other in spaced relationship;
a plurality of inwardly concave side walls, each extending between a pair of said frame members and anchored along its longitudinal edges to said pair of frame members;
and means sealing the edges of each of said concave side walls to said frame, said means including
a rib on each end wall underlying a side edge of the proximate concave side wall and following the curvature thereof,
a sealing groove in each connecting frame member longitudinally thereof and terminating at each end at the end of the proximate end wall rib, and
a seal running along said ribs and associated grooves against which such concave side wall bears.

3. A vessel adapted to withstand heavy external pressure without collapsing, comprising
a frame including
a pair of end walls,
frame members connecting said end walls,
said frame members being substantially parallel to each other in spaced relationship;
a plurality of inwardly concave side walls, each extending between a pair of said frame members and between said end walls;
means releasably anchoring said side walls to said frame members to permit release therefrom with little likelihood of damage to said side walls and said frame thereby permitting simple reassembly of said vessel;
and means sealing the edges of each of said side walls to said frame.

4. A vessel adapted to withstand heavy external pressure without collapsing, comprising
a frame including
a pair of end walls,
frame members connecting said end walls,
said frame members being substantially parallel to each other in spaced relationship, and each having an anchoring groove on each side running longitudinally thereof;
a plurality of inwardly concave side walls, each extending between a pair of said frame members and anchored along its longitudinal edges in the proximate anchoring grooves of said pair of frame members;
and means sealing the edges of each of said side walls to said frame, said means including
a rib on each end wall underlying a side edge of the proximate concave side wall and following the curvature thereof,
a sealing groove in each connecting frame member longitudinally thereof and terminating at each end at the end of the proximate end wall rib, and
a seal running along said ribs and associated grooves against which such concave side wall bears.

References Cited by the Examiner

UNITED STATES PATENTS

| 2,095,565 | 10/1937 | Lightle | 220—71 |
| 2,557,990 | 6/1951 | Moyer et al. | 220—1 |
| 2,818,191 | 12/1957 | Arne | 220—1 |

FOREIGN PATENTS

| 644,147 | 4/1937 | Germany. |
| 466,906 | 11/1951 | Italy. |

THERON R. CONDON, *Primary Examiner.*